United States Patent
Wu et al.

(10) Patent No.: US 9,672,288 B2
(45) Date of Patent: Jun. 6, 2017

(54) QUERY SUGGESTIONS

(71) Applicant: Yahoo! Inc., Sunnyvale, CA (US)

(72) Inventors: Hui Wu, Sunnyvale, CA (US);
Shenhong Zhu, Santa Clara, CA (US);
Huming Wu, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 240 days.

(21) Appl. No.: 14/144,250

(22) Filed: Dec. 30, 2013

(65) Prior Publication Data
US 2015/0186394 A1 Jul. 2, 2015

(51) Int. Cl.
*G06F 15/16* (2006.01)
*G06F 17/30* (2006.01)

(52) U.S. Cl.
CPC .... *G06F 17/30867* (2013.01); *G06F 17/3064* (2013.01)

(58) Field of Classification Search
CPC ......... G06F 17/30864; G06F 17/30873; G06F 17/30867
USPC ........................................................ 709/203
See application file for complete search history.

(56) References Cited

U.S. PATENT DOCUMENTS

| | | | |
|---|---|---|---|
| 7,743,047 B2 | 6/2010 | White et al. | |
| 8,065,316 B1 * | 11/2011 | Baker | G06F 17/30864 707/768 |
| 8,117,208 B2 | 2/2012 | Chang et al. | |
| 8,171,021 B2 | 5/2012 | Guha et al. | |
| 8,352,465 B1 * | 1/2013 | Jing et al. | 707/723 |
| 2005/0125427 A1 | 6/2005 | Dageville et al. | |
| 2006/0112087 A1 | 5/2006 | Smyth et al. | |
| 2006/0242138 A1 | 10/2006 | Brill et al. | |
| 2007/0266002 A1 * | 11/2007 | Chowdhury et al. | 707/2 |
| 2008/0027932 A1 | 1/2008 | Brunner et al. | |
| 2008/0256061 A1 * | 10/2008 | Chang | G06Q 30/02 |
| 2008/0281817 A1 | 11/2008 | White et al. | |
| 2008/0294686 A1 * | 11/2008 | Long et al. | 707/103 R |
| 2008/0306937 A1 | 12/2008 | Whilte et al. | |
| 2009/0006333 A1 | 1/2009 | Jones et al. | |
| 2009/0030876 A1 * | 1/2009 | Hamilton | 707/3 |
| 2009/0248661 A1 | 10/2009 | Bilenko et al. | |
| 2009/0259632 A1 | 10/2009 | Singh | |
| 2009/0281973 A1 | 11/2009 | Selinger et al. | |
| 2010/0306229 A1 * | 12/2010 | Timm et al. | 707/767 |
| 2011/0093488 A1 | 4/2011 | Amacker et al. | |
| 2011/0106799 A1 | 5/2011 | Barkai et al. | |
| 2011/0191364 A1 | 8/2011 | LeBeau et al. | |
| 2011/0202522 A1 | 8/2011 | Ciemiewicz et al. | |
| 2011/0258148 A1 * | 10/2011 | Gao | G06F 17/30867 706/12 |
| 2011/0264673 A1 | 10/2011 | White et al. | |
| 2011/0289068 A1 | 11/2011 | Teevan et al. | |

(Continued)

OTHER PUBLICATIONS

Liu, Y., et al., "How do users describe their information need: Query recommendation based on snippet click model", in Expert System with Applications, 2011, 10 pages.

(Continued)

*Primary Examiner* — June Sison
*Assistant Examiner* — Dixon Dabipi
(74) *Attorney, Agent, or Firm* — Berkeley Law & Technology Group, LLP (57) ABSTRACT

Briefly, embodiments of methods and/or systems for providing enhancements to search query processing are disclosed.

15 Claims, 3 Drawing Sheets

(56) References Cited

U.S. PATENT DOCUMENTS

| | | |
|---|---|---|
| 2011/0307320 A1 | 12/2011 | Tagney et al. |
| 2012/0047145 A1 | 2/2012 | Heidasch |
| 2012/0166438 A1 | 6/2012 | Wu et al. |
| 2012/0203717 A1* | 8/2012 | Xu .................. H04L 9/3236 706/12 |
| 2012/0259851 A1 | 10/2012 | Holmes et al. |
| 2012/0260185 A1 | 10/2012 | Choc et al. |
| 2012/0265779 A1 | 10/2012 | Hsu et al. |
| 2012/0323828 A1* | 12/2012 | Sontag ............. G06F 17/30011 706/12 |

OTHER PUBLICATIONS

Bilenko, M., et al., "Mining the Search Trails of Surfing Crowds: Identifying Relevant Websites from User Activity", WWW 2008, Apr. 21-25, 2008, Beijing, China, 10 pages.

Hopfgarner et al., "Search Trails using User Feedback to Improve Video Search", ACM, MM'08, Oct. 26-31, 2008, Vancouver, Canada, 2008, 10 Pages.

White, R.W. et al., "Assessing the Scenic Route: Measuring the Value of Search Trails in Web Logs", SIGIR'10, Jul. 19-23, 2010, Geneva, Switzerland, 8 pages.

White, R.W., et al., "Leveraging Popular Destinations to Enhance Web Search Interaction", ACM Transactions on the Web, vol. 2, No. 3, Article 16, Publication Date: Jul. 2008, 30 Pages.

Bailey et al., "Mining Historic Query Trails to Label Long and Rare Search Engine Queries", ACM Transaction on the Web, vol. 4, No. 4, Article 15, Sep. 2010, 27 Pages.

Singla et al., "Studying Trailfinding Algorithms for Enhanced Web Search", ACM, SIGIR' 10, Jul. 19-23, 2010, Genava, Switzerland, pp. 443-450 (8 pages).

Bruza et al., "Interactive Internet Search, Keyword, Directory and Query Reformulation Mechanism Compared", ACM, SIGIR 2000, Athens, Greece, 2000, pp. 280-287 (8 pages).

L. Suganya, et al., "Efficient Semantic Similarity Based FCM for Inferring User Search Goals with Feedback Sessions", International Journal of Computer Trends and Technology (IJCTT) vol. 4, Issue 9, Sep. 2013, 6 pages).

U.S. Appl. No. 13/286,204 / Application as filed Oct. 31, 2011, 71 pages.

U.S. Appl. No. 13/286,204 / Notice to file missing parts and filing receipt, mailed Nov. 16, 2011, 5 pages.

U.S. Appl. No. 13/286,204 / Response to notice to file missing parts, mailed Jun. 8, 2012, 9 pages.

U.S. Appl. No. 13/286,204 / Filing receipt, mailed Jun. 15, 2012, 3 pages.

U.S. Appl. No. 13/286,204 / Non-Final Rejection, mailed Nov. 20, 2012, 20 pages.

U.S. Appl. No. 13/286,204 / Non-Final Office Action response, mailed Mar. 19, 2013.

U.S. Appl. No. 13/286,204 / Notice of publication, mailed May 2, 2013, 1 page.

U.S. Appl. No. 13/286,204 / Final Office action, mailed May 6, 2013, 24 pages.

U.S. Appl. No. 13/286,204 / Response to Final Office Action, mailed Jul. 8, 2013, 15 pages.

U.S. Appl. No. 13/286,204 / Advisory Action and Rule 312 amendment, mailed Jul. 15, 2013, 18 pages.

U.S. Appl. No. 13/286,204 / Request for Continued Examination, mailed Aug. 6, 2013, 17 pages.

U.S. Appl. No. 13/335,692 / Application as filed on Dec. 22, 2011, 47 Pages.

U.S. Appl. No. 13/335,692 / Notice to File Missing Parts, Mailed Jan. 10, 2012, 5 Pages.

U.S. Appl. No. 13/335,692 / Applicant Response to Notice to File Missing Parts, filed Mar. 12, 2012, 12 Pages.

U.S. Appl. No. 13/335,692 / Filing Receipt, Mailed Mar. 20, 2012, 3 Pages.

U.S. Appl. No. 13/335,692 / Filing Receipt, Mailed Mar. 26, 2012, 3 Pages.

U.S. Appl. No. 13/335,692 / Non-Final Rejection, Mailed Mar. 8, 2013, 13 Pages.

U.S. Appl. No. 13/335,692 / Amendment, Filed Jun. 10, 2013, 13 Pages.

U.S. Appl. No. 13/335,692 / Notice of Publication, Mailed Jun. 27, 2013, 1 Page.

U.S. Appl. No. 13/335,692 / Final Rejection, Mailed Aug. 1, 2013, 18 Pages.

U.S. Appl. No. 13/335,692 / Request for Continued Examination, filed Nov. 1, 2013, 19 Pages.

* cited by examiner

QUERY SUGGESTIONS

BACKGROUND

1. Field

This disclosure relates to providing search query related suggestions.

2. Information

A computerized search engine may operate by receiving a submitted search query, comprising one or more search terms, from a computing device and comparing search query terms with indexed terms from a potentially large number of electronically stored documents, for example. Electronically stored content, also referred to here as electronic documents without loss of generality, that may appear relevant to one or more search terms may be ranked, for example, according to one or more query processing approaches. Responsive to, for example, a query processing operation, a search engine may return a list, for example, of relevant electronic documents for presentation to a user, such as by way of a display device, for example, typically after one or more client-server type network interactions (e.g., communications). A list of relevant electronic documents may be arranged on a computing display device, for example, in order of relevance with respect to a received search query (and/or other factors).

At times, electronic documents returned by a search engine performing, for example, a search query processing operation, may appear to have reduced relevance with respect to a search query. Thus, in some instances, responsive to receiving numerous search results of reduced relevance, a user may painstakingly comb through a large number of search results in an attempt to uncover one or more reasonably pertinent search results. As a consequence, a user may lose patience, terminate further search query operations and/or proceed with research into a particular field of study, for example, with little benefit from computing-implemented search tools. A computing device user may thus pursue his or her investigations into a topic of interest using less accurate, less relevant, and/or potentially out-of-date electronic documents or other more manual approaches, for example.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to "one implementation," "an implementation," "one embodiment," "an embodiment" and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled," "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. Though it should be noted that this is merely an illustrative example and claimed subject matter is not limited to this example. Again, particular context of description or usage may provide helpful guidance regarding inferences to be drawn.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term "network device" refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including among wireless devices coupled via a wireless network, for example. It is noted that the terms, server, server device, server computing device, server computing platform, and/or similar terms are used interchangeably. Similarly, the terms "client," "client device," "client computing device," "client computing platform," and/or similar terms are also used interchangeably. While in some instances, for ease of description, these terms may be used in the singular, such as by referring to a "client computing device" or a "server device," or a "server" the description is intended to encompass one or more client devices or one or more devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term "transparent" refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wire-less networks, and/or long-haul public networks that, for example, may allow signal packets to be communicated between LANs. The term world wide web (WWW) and/or similar terms may also be used, but may refer to a subset of the Internet compliant with a particular set of communication protocols, such as the hypertext transfer protocol, for example. Signal packets, also referred to as signal packet transmissions, may be communicated among nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with," "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

A network may be very large, such as comprising thousands of nodes, millions of nodes, billions of nodes, or more, as examples. Media networks, such as the Yahoo!™ network, for example, may be increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, a server (or other source) located within or external to a processing and/or communications infrastructure of a media network may deliver relevant content, which may include, for example, textual and/or multimedia content that may entice users to remain for a relatively extended period of time. Access, such as links to content (e.g., such as hyperlinks to websites located outside of a media network), may also be presented to users. Thus, even if users are directed to websites outside of a particular media network, users may remain loyal to the media network in the future if they believe that the network consistently provides access, such as links, or otherwise directs them to relevant, up-to-date, and/or useful content. In this context, the term "content" includes, as examples, images, video, audio, text, and/or multimedia, such as in the form of stored physical (e.g., memory) states or in the form of electronic signals, for example.

As a non-limiting example, responsive to submitting a search query (e.g., terms that may be submitted to a search engine) for example, or as a result of any other type of interaction with a client computing platform, for example, such as via a browser, a user may access one or more pages (e.g., web pages), for example. In an implementation, a "cookie" and/or other identifier (e.g., for example, locally stored physical (e.g., memory) states capturing details regarding a website interaction) may be used to identify a client computing platform, including a client computing device, to one or more servers, for example, as well as other uses. To perform a search query and/or a content retrieval operation, for example, a server, such as a query server, may perform one or more operations based, at least in part, on one or more modules of implementable instructions for a computing device. In this context, the term query server refers to one or more servers that include a capability to process a search query and deliver as, a consequence of processing, search results that may be relevant to the processed search query. It is noted that terms, such as "operation," and "function," or the like may be used interchangeably in this context. It is also noted that, in this context, the term 'click', 'click-through', and similar terms are meant to refer to user interactions with a computing device, regardless of how executed, such as click, touch, hover, voice-command, etc.

In general, many users, such as users of client computing devices, may seek out accurate, relevant, and/or up-to-date search results responsive to one or more search queries capable of being processed by a search engine, for example. Search query results and/or query suggestions that may be beneficial to a user in conducting further search operations may be delivered to a client computing device, such as for presentation to a user, by way of display device coupled to a client computing device. Search results and/or search query suggestions, for example, may be arranged, at least in some instances, in decreasing order of relevance as determined and/or estimated by search query processing operations. Presentation of search results, such as in decreasing order of relevance (e.g., more relevant search results displayed near a top portion of a search results page), as a non-limiting example, may permit a user of a client computing device to reasonably quickly and/or efficiently access one or more electronically stored documents, for example, that may be reasonably pertinent to a user's search query. Of course, claimed subject matter is not limited in scope to illustrative examples, such as the foregoing.

As previously alluded to, in addition to providing search results, a search engine may further supply related query suggestions which may, for example, comprise reformulations and/or restatements of search terms of a particular search query. Reformulations and/or restatements of search terms may represent, for example, alternative approaches toward expressing meaning and/or underlying logic, for example, of one or more search terms of a query. In one possible example, a query comprising terms "How long are chickens alive?" may bring about to a reformulated/restated query suggestion, such as "Chicken lifespan." In many instances, reformulations/restatements may permit a computing device user to refine a search query, including terms of the query, via search query suggestions being provided, which, as a result of submitting a more refined search query, for example, may enable a search engine to provide search results that may more accurately represent a user's intent, for example.

However, in some instances, a client computing device user, for example, may submit certain types of search queries, such as "complex" queries, that may not bring about particularly accurate and/or relevant search results. Furthermore, query suggestions may also not be particular accurate and/or relevant, making refinement of the query more of a challenge. As the term is used herein, a "complex" query may be used to denote a query that may include more search terms than is typical and/or a query comprising multiple (e.g., two or more) terms that may have a variety of potentially disparate meanings. For example, terms having a variety of potentially unique or otherwise different meanings may make it more difficult to identify a "click-through" relationship with relevant universal resource locators (URLs). In one instance, just to provide a possible example, if a query comprising "high school multipurpose activity center blueprints" were to be submitted to a server, for example, one or more URLs may result as suggestions that may be relevant to search terms "high school," "multipurpose activity," "center," and/or "blueprints," for example. In addition, a server may determine query suggestions relevant to, for example, the search terms "high school," such as "middle school," "secondary school," and/or "high school academic standards," and so forth. A server may additionally determine query suggestions that may be relevant to other portions of the search query, such as "multipurpose activity," "center," and/or "blueprints." However, although a server may determine query suggestions that may be relevant to at least portions of a complex search query, such as "high school," "multipurpose activity," and so forth, query suggestions may be less like to be meaningful overall as a result of complexity of the query, which may comprise a number of diverse search terms, for example, whose intended meaning may be unclear, even in context with respect to other terms of the query.

Consequently, client computing device users may benefit from search query processing approaches that may bring about more accurate and/or more relevant suggestions for complex queries, for example. In embodiments, an approach toward improved accuracy and/or improved relevance in identifying query suggestions for complex queries may likewise bring about improvements in relevance of query suggestions for less complex search queries.

As described further herein, embodiments may involve a technique for identifying potential semantic relationships via click-through feedback, for example. One embodiment, for example, may employ K-means clustering of identified semantic relations among terms of a search query, such as a complex query, for example. Again, in an embodiment this may provide improved relevance and/or improved accuracy in terms of identifying semantically related query suggestions.

In embodiments, K-means processing may consume nominal computing resources, or even less, perhaps. Additional embodiments may provide improved accuracy and/or improved relevance of suggestions for complex queries, but with application of more computing resources. For example, an embodiment may employ a semi-definite programming (SDP) approach, as described in more detail below. For example, at a high level, an approach employing SDP may be more precise than K-means processing, for example, in terms of evaluating and/or identifying semantically associated terms. Of course, claimed subject matter is not limited in scope to particular examples, such as these illustrations.

Figure 1:
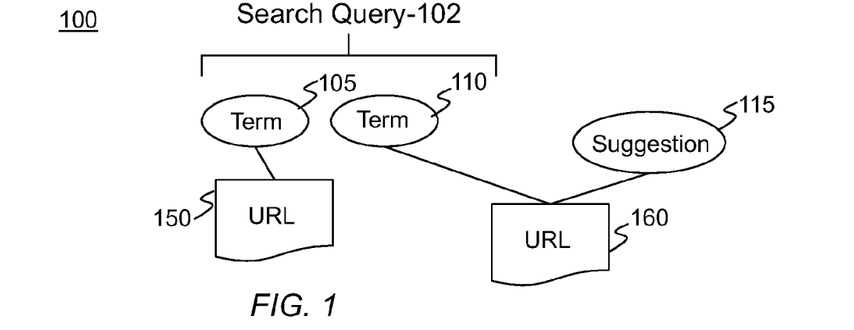
FIG. 1 is a block diagram showing a relationship among search query terms in accordance with an embodiment.

FIG. 1 is a block diagram 100 showing a relationship among search query terms in accordance with an embodiment. In FIG. 1, search query 102 may comprise a plurality of search terms, such as search term 105 and search term 110. Thus, in one possible example, just for the sake of illustration, search term 105 may comprise a first bigram, such as "high school," and search term 110 may comprise a second bigram, such as "multipurpose activity." URL 150 may, just for the sake of illustration, comprise a URL that links to an electronic document pertaining to a local high school. It should be noted that although search query 102 is illustrated in FIG. 1 as comprising two search terms, embodiments may comprise a larger number of search terms (e.g., three or more), and claimed subject matter is not limited to a particular number of search terms of a search query. It should also be noted that one or more of search terms 105, and 110 may comprise a string of characters, such as a single word, or may comprise an n-gram, such as a bigram (e.g., a pair of consecutive words and/or numbers), a trigram (e.g., a group of three consecutive words and/or numbers), or any combination thereof, including multiple character strings. It is noted, in this context, that search query terms are not limited in scope to words; rather, a string of characters, for example, may comprise a search query term.

In embodiments, nonetheless, if a threshold number, such as a relatively significant percentage, for example, of client computing device (e.g., via users), have selected (e.g., "clicked-through") search term 110 and suggestion 115 so as to be directed by a client computing device to URL 160, for example, search term 110 and query suggestion 115 may be postulated to be semantically related, in an embodiment. In this context, this may be referred to as identifying a semantic relationship via click-through feedback. Additionally, URL 160 may, at least in particular embodiments, represent a "semantic feature" of search term 110 and query suggestion 115, at least in a probabilistic sense over a large number of click-throughs (CTRs), for example. Of course, it is likewise understood that "click-through" or CTR comprises one example of a selection mechanism for user interaction with a computing device and is intended here to refer to any and all selection mechanisms, such as via stylus, touch, mouse hovering, etc. In one possible example of identifying a semantic relationship, if search term 110 comprises "new cars" and query suggestion 115 comprises "new automobiles," search term 110 and query suggestion 115 may comprise a semantic relationship if search term 110 and query suggestion 115 link to URL 160, which may, for example, represent a website for new and/or used automobiles. In at least some embodiments, semantic relationships may exist among search terms and/or suggestions if click-throughs to a URL, such as URL 160, typically occur over a reasonably large number, such as at least a threshold number of times (e.g., 100 times, 200 times, and so forth) and/or a threshold percentage (e.g., 50%, 60% etc.), such as during a length of time (e.g., over a three-month period, over a six-month period, over a year-long period, and so forth); however, claimed subject matter is not limited to any particular number of CTRs, percentage of CTRs, and/or any particular length of time during which CTRs may occur. Conversely, at least in some embodiments, search term 105 of FIG. 1 may be semantically unrelated to query suggestion 115 since typically selecting and/or clicking on search term 105 does not over a reasonably large number of CTRs redirect a client computing device user to URL 160, such as more than a threshold number of instances, a threshold percentage of instances and/or during a particular timespan, for example.

Figure 2:
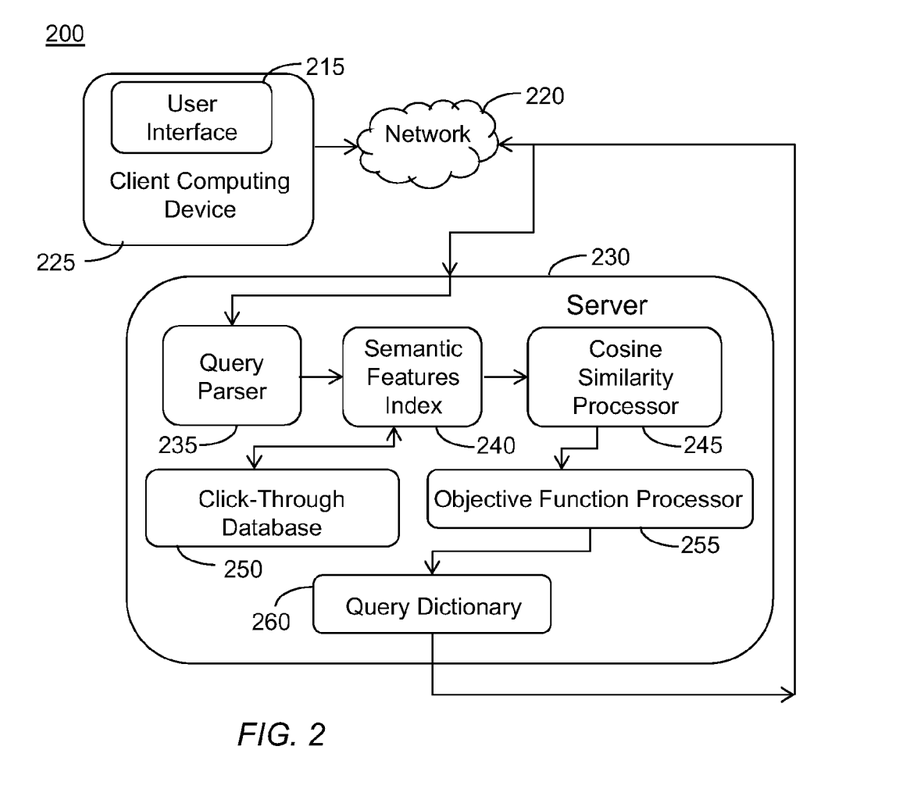
FIG. 2 is a schematic diagram of a client computing device communicating with a server by way of a network device according to an embodiment.

FIG. 2 is a schematic diagram 200 of a client computing device communicating with a server by way of a network device according to an embodiment. In FIG. 2, client computing device 225 may submit, for example, a complex query by way of interface 215, in an example embodiment. Electronic signals representing a complex query may be transmitted via network 220, which may comprise the Internet, a corporate Ethernet, a wireless network, and/or any other type of communications channel, to server 230. It should be noted that although a single client computing device is shown in FIG. 2, claimed subject matter is not limited to any particular number of client computing devices that may be used to communicate electronic signals representing complex queries to query server 230; likewise claimed subject matter is not intended to be limited to a particular number of servers, etc. In embodiments, client computing devices and/or servers may number into the thousands, millions, etc., without limitation.

In embodiments, responsive to a complex query (e.g., receipt in one embodiment), parser 235 may operate and/or function to parse a complex query into, for example, constituent search terms. Thus, in one possible example, a complex query, such as "high school multipurpose activity center blueprints," may be parsed into n-grams, such as "high school," "multipurpose activity," "center," and/or "blueprints," for example. Parsing of a query may also comprise a correction and/or modification of spelling and/or grammatical attributes, translation and/or transliteration from a first language to a second language, for example, as well as additional clarifying operations and/or functions, and claimed subject matter is not limited in this respect.

Parsed complex queries may be processed in connection with a semantic features index 240, which may operate and/or function to determine URLs comprising an observed (empirical) semantic relationship with parsed search terms (e.g., bigrams, trigrams, and so forth) in an embodiment. Thus, in an embodiment, output signals may be representative of an output result of semantic features index 240 and may be expressed substantially in accordance with $$SF(q)=(URLCnt_1, URLCnt_2, \ldots, URLCnt_m) \quad (1)$$

wherein, expression 1 indicates observed semantic features SF(q) of a complex query "q," and wherein $URLCnt_1$ indicates a click-through count of a particular parsed search term, for example. In embodiments, click-through counts of expression 1 may be accessed by way of click-through database 250. In addition, in an embodiment, an observed (empirical) relation between $q_i$ and $q_j$ may be measured substantially in accordance with an expression:

$$Relation(q_i,q_j)=Cosine(SF(q_i),SF(q_j)) \quad (2)$$

wherein expression 2 indicates cosine similarity between $SF(q_i)$ and $SF(q_j)$, which may be computed using cosine similarity via a processor, such as 245, for example. Of course, claimed subject matter is not limited in scope to employing cosine similarity and/or to employing a processor; these are simply illustrative examples.

Based, at least partially on expressions 1 and 2, an objective function may be formulated, as illustrated below, for example. In embodiments, for example, a processor 255 may numerically approximate values, for example, to be substantially in accordance with an expression, referred to here as an objective function $$\operatorname{argmax}_{(S \subset E, \forall e \in E, Relation(SF(e),SF(q))) > 0}$$

$$(\Sigma_{s \in S, p \in E \setminus S} Relation(SF(s),SF(p)) - \Sigma_{r \in S, t \in S} Relation(SF(r),SF(t))) \quad (3)$$

which may be subject to a variety of constraint expressions, as further described below. Here, however, substantially in accordance with expression (3), for an embodiment, a query set "S," S may further comprise a relatively high relevance subset (E\S), which, at least in some embodiments, may represent an attempt to select sufficiently relevant query suggestions over query set S, in this example. In embodiments, it may also be desirable for a selected subset of S to comprise little more than an acceptably small amount of internal relevance among elements. For example, in an embodiment, doing so may give rise, at least in some embodiments, to diversified query suggestions. This may be captured in an embodiment by subtracting the second summation in expression (3), for example.

An approximate approach to evaluation of expression (3) may be achieved by way of K-means clustering, which may be performed via a computing device executing instruction, in an embodiment. For example, pseudo code, as provided below, illustrates an example approach. In an embodiment, for example, computation may begin, responsive to a query (q), such as may be supplied by or obtained from a client computing device, for example. Of course, this is merely an illustrative example and intended to be non-limiting.

A query suggestion set S, for example, may be electronically stored in query dictionary 260 (in which |S|=n). Query dictionary 260 may, in an embodiment, comprise a query portion and a query suggestion portion, which may permit, for example, future similar queries to be processed by way of accessing the query dictionary, for example. K-means clustering is, of course, well understood and need not be described in detail. In implementations, however, as an example, a K-means clustering approach may proceed in accordance with the following approach:

Initiate E, in which $\forall e \in E$, relations (SF(e), SF(q))>0
Process K-Means on E to form n clusters: $C_1, C_2, \ldots, C_n$, where $C_i \cap C_j = 0$ and $\cup_i^n C_i = E$;
S=0;
for i=1; i<=n; i++ do
 $s = \operatorname{argmin}_p \in_{Ci} \Sigma_{t \in Ci\{p\}}$ Relation(SF(p),SF(t));
 $S = S \cup \{s\}$ In particular embodiments, K-means clustering may bring about one or more query suggestions that are relatively close in distance and/or may approximate at least one centroid of a K-means cluster. Thus, semantically related URLs, for example, may be identified. In one possible example, if 10 query suggestions are desired, i may be set to 10 in the example above.

In embodiments, a potentially more accurate approach may be achieved through use of semi-definite programming. By way of semi-definite programming, for example, expression 3 may be represented as query suggestions and semantic relations on a weighted graph, such as weighted graph 300 of FIG. 3. Thus, an objective subject to constraints may result in improved results, as described below in an embodiment.

Figure 3:
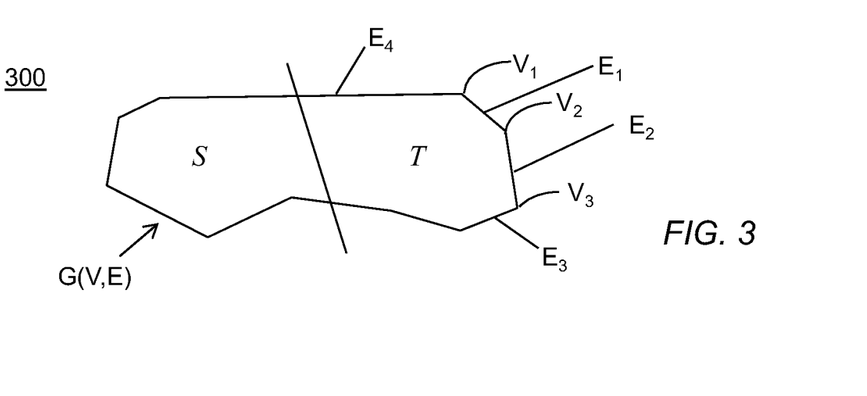
FIG. 3 is a diagram of a partitioned weighted graph according to an embodiment.

In FIG. 3, a weighted graph (G(V,E)) comprises nodes, such as $V_1, V_2, V_3$, etc., which may represent suggestions. A weight of an edge, such as $E_1, E_2, E_3$, and $E_4$, for example, may indicate a correlation between two nodes. For the sake of simplicity, let G(V,E) comprise two partitioned regions, S and T, which represent, for example, queries that are partitioned or categorized as described for this example embodiment. In FIG. 3, for example, region S may represent one or more 'more' desirable query suggestions, and region T may, for example, represent one or more 'less' desirable query suggestions. Further, S∩T=0, and S∪T=E. Additionally, let nodes in region S represent query suggestions and be set equal to or approximate 1.0, and nodes in region T may be set equal to or approximate −1.0, for example. Further, let x comprise a factor indicating assignments of all nodes, such that $x_i \in \{-1, 1\}$, and such that $x_i=1.0$, for example, implies that the $i_{th}$ node may be assigned to S, while $x_i=-1.0$ implies that $x_i=1.0$ for the $i_{th}$ node may be assigned to T. In this context, expression 3 may be reformulated as:

$$\operatorname{argmax} \Sigma_{v_j \in S, v_j \in T} w_{ij} - \Sigma_{v_j \in S, v_j \in S} w_{ij} \quad (4)$$

wherein $v_i$ represents an indexing variable over the summation, for example.

Substituting $x_i \in \{-1, 1\}$ into expression 4, the expression may be rearranged as:

$$\operatorname{argmax}(\Sigma_{i<j} w_{ij}(1-x_i x_j) - \tfrac{1}{8}(x_i+x_j)(2+x_i+x_j)w_{ij}) \quad (5)$$

Factoring the ⅛ in expression 5 to distribute over the summation yields:

$$\operatorname{argmax} \tfrac{1}{8} \Sigma_{i<j} 4^* w_{ij}(1-x_i x_j) - (x_i+x_j)^*(2+x_i+x_j)w_{ij} \quad (6)$$

Factoring $w_{ij}$ from expression 6 yields:

$$\operatorname{argmax} \tfrac{1}{8} \Sigma_{i<j} w_{ij}(4^*(1-x_i x_j) - (x_i+x_j)^*(2+x_i+x_j)) \quad (7)$$

Expanding and regrouping expression 7 yields the expression:

$$\operatorname{argmax} \tfrac{1}{8} \Sigma_{i<j} w_{ij}((4-4^* x_i x_j) - 2(x_i+x_j) - (x_i+x_1)^2) \quad (8)$$

Further expanding expression 8 yields the expression:

$$\operatorname{argmax} \tfrac{1}{8} \Sigma_{i<j} w_{ij}(4-4 x_i x_j - 2(x_i+x_j) - x_i^2 - 2x_i x_j - x_j^2) \quad (9)$$

Since $x_i^2=1$ and $x_j^2=1$, expression 9 may be rearranged as:

$$\operatorname{argmax} \tfrac{1}{8} \Sigma_{i<j} w_{ij}(4-4 x_i x_j - 2(x_i+x_j) - 1 - 2x_i x_j - 1) \quad (10)$$

Expression 10 may be simplified as:

$$\operatorname{argmax} \tfrac{1}{8} \Sigma_{i<j} w_{ij}(2-6 x_i x_j - 2(x_i+x_j)) \quad (11)$$

Expression 11 may be further simplified as:

$$\operatorname{argmax} \tfrac{1}{8} \Sigma_{i<j} w_{ij}(1-3 x_i x_j - (x_i+x_j)) \quad (12)$$

Distributing the summation over terms of expression 12 yields the expression:

$$\operatorname{argmax} \tfrac{1}{4} (\Sigma_{i<j} w_{ij} - \Sigma_{i<j} w_{ij}(3 x_i x_j - (x_i+x_j))) \quad (13)$$

In embodiments, $\Sigma_{i<j} w_{ij}$ of expression 13 may comprise a constant value. Accordingly, assuming that weights sum to a constant value, expression 13 may be rearranged as:

$$\operatorname{argmin} \Sigma_{i<j} w_{ij}(3 x_i x_j + (x_i+x_j)) \quad (14)$$

wherein the function argmax has been replaced with argmin as a result of a change of sign from expression 13 to expression 14. Additionally, adding the constraint $x_i \in \{-1, 1\}$, produces:

$$\operatorname{argmin} \Sigma_{i<j} w_{ij}(3 x_i x_j + (x_i+x_j)) \quad (15)$$

wherein expression 15 is subject to a condition, here $x_i \in \{-1, 1\}$. Further, at least in some embodiments, expression 15 may represent a feasible objective, such as in the context of SDP. In particular embodiments, it may be desirable to formulate expression 15 into a form substantially corresponding to:

$$\operatorname{argmin} \sum_{x \in S^n} \langle C, X \rangle_{S^n} \quad (16)$$

Subject to: $\langle A_k, X \rangle_{S^n} = b_i, i = 1, \ldots, m.$ $X \succcurlyeq 0$ Thus, expression 15 may be re-formulated substantially in accordance with a general SDP form like expression 16, such as follows:

$$\operatorname{argmin} \sum_{i<j} w_{ij}(3 x_i x_j + (x_i + x_j)) \quad (17)$$

$$\operatorname{argmin} \sum_{i<j} w_{ij} 3(3 x_i x_j + (x_i + x_j) + 1) \quad (17a)$$

$$\operatorname{argmin} \sum_{i<j} w_{ij}(9 x_i x_j + 3 x_i + 3 x_j + 1) \quad (17b)$$

$$\operatorname{argmin} \sum_{i<j} w_{ij}(3 x_i + 1)(3 x_j + 1) \quad (17c)$$

wherein, in expression 17a, a constant (3) has been multiplied by the quantity inside the summation. In embodiments, multiplication by a constant may typically have little or no effect on a argmin operator.

Expressions 17c and 16 may be combined into expression 18 below:

$$\operatorname{argmin} \sum_{i<j} w_{ij}(3 x_i + 1)(3 x_j + 1) \quad (18)$$

Subject to: $3x_i + 1 \in \{-2, 4\}$

In expression 18, if $$y_i = 3x_i + 1 \quad (18a)$$

expression 17 may be rearranged as:

$$\operatorname{argmin} \sum_{i<j} w_{ij} y_i y_j \quad (18b)$$

Subject to: $y_i \in \{-2, 4\}$

In embodiments, expression 18b may be rearranged as:

$$\operatorname{argmin} \sum_{i<j} w_{ij} y_i y_j \quad (19)$$

Subject to $(y_i - 1)^2 = 9$

Simplifying, to form expression 20:

$$\operatorname{argmin} \sum_{i<j} w_{ij} y_i y_j \quad (20)$$

Subject to: $y_i^2 - 2y_i = 8$ which may represent a closed form of a semi-definite programming expression which, at least in some embodiments, may be similar to expression 4, provided previously.

In embodiments, to generate a substantially similar form of expression 4, additional algebraic manipulation may be employed. Hence, a variable z may be introduced which, in vector form, may be expressed as:

$$z = (y_1, y_2, \ldots, l_{n+1}, l_{n+2}, \ldots, l_{2n})^T \quad (21)$$

Thus, if expression 21 is substituted into expression 20, expressions 22 and 23 may be formed as:

$$\operatorname{argmin} z^T = Cz \quad (22)$$

Subject to: $\forall\, l \le i \le n,\; z^T A_i z = 8$, where, $$C = \begin{pmatrix} 0 & w_{1,2} & \ldots & w_{1,n} & 0 & 0 & \ldots & 0 \\ w_{2,1} & 0 & \ldots & w_{2,n} & 0 & 0 & \ldots & 0 \\ \vdots & \vdots & \ddots & \vdots & 0 & \ddots & \vdots & 0 \\ w_{n,1} & w_{n,2} & \ldots & 0 & 0 & 0 & \ldots & 0 \\ 0 & 0 & \ldots & 0 & 0 & 0 & \ldots & 0 \\ \vdots & \vdots & \ddots & \vdots & 0 & \ddots & \vdots & 0 \\ 0 & 0 & \ldots & 0 & 0 & 0 & \ldots & 0 \end{pmatrix}$$

for $\forall\, l \le i \le n$, and  (23)

$$A_i = \begin{pmatrix} 0 & 0 & \ldots & 0 & 0 & 0 & \ldots & 0 \\ 0 & 0 & \ldots & 0 & 0 & 0 & \ldots & 0 \\ \vdots & \vdots & \ddots & \vdots & 0 & \ddots & \vdots & 0 \\ \vdots & \vdots & \ddots & 1_{i,i} & 0 & \ddots & \vdots & 0 \\ \vdots & \vdots & \ddots & \vdots & 0 & \ddots & \vdots & 0 \\ 0 & 0 & \ldots & -1_{n+1,i} & 0 & 0 & \ldots & 0 \\ 0 & 0 & \ldots & -1_{n+2,i} & 0 & 0 & \ldots & 0 \\ 0 & 0 & \ldots & 0_{n+3,i} & 0 & 0 & \ldots & 0 \\ \vdots & \vdots & \ddots & \vdots & 0 & \ddots & \vdots & 0 \\ 0 & 0 & \ldots & 0 & 0 & 0 & \ldots & 0 \end{pmatrix}$$

for $\forall\, l \le i \le n$.

In embodiments, if $X = z^T z$ (wherein "z" denotes a vector quantity), expressions 22 and 23 may be reformulated as:

$$\operatorname{argmin} \langle C, X \rangle_{S^{2n}} \quad (24)$$

$$\forall\, l \le i \le n,\; \langle A_i, X \rangle_{S^{2n}} = 8$$

as $z_i^2 - 2*z_i = 8$, when $z_i = y_i$ in expression 21. Further, $\forall\, n+1 \le i \le 2n$, $\langle A_i, X \rangle_{S^{2n}} = -1$ as $(z_i - 1)^2 = 0$. In embodiments, this may imply, for example, $Z_i^2 - 2*z_i = -1$, when $z_i = 1$, in expression 21. Further, for $\forall\, l \le i \le 2n$,  (25)

$$A_i = \begin{pmatrix} 0 & 0 & \ldots & 0 & 0 & 0 & \ldots & 0 \\ 0 & 0 & \ldots & 0 & 0 & 0 & \ldots & 0 \\ \vdots & \vdots & \ddots & \vdots & 0 & \ddots & \vdots & 0 \\ \vdots & \vdots & \ddots & 1_{i,i} & 0 & \ddots & \vdots & 0 \\ \vdots & \vdots & \ddots & \vdots & 0 & \ddots & \vdots & 0 \\ 0 & 0 & \ldots & -1_{n+1,i} & 0 & 0 & \ldots & 0 \\ 0 & 0 & \ldots & -1_{n+2,i} & 0 & 0 & \ldots & 0 \\ 0 & 0 & \ldots & 0_{n+3,i} & 0 & 0 & \ldots & 0 \\ \vdots & \vdots & \ddots & \vdots & 0 & \ddots & \vdots & 0 \\ 0 & 0 & \ldots & 0 & 0 & 0 & \ldots & 0 \end{pmatrix}$$

$X \succcurlyeq 0$

In embodiments, expression 4 may be formulated into a semi-definite programming equivalent form that accords with expression 25, for example. Accordingly, resolving expression 25 may, at least in some embodiments, resolve expression 4 at least approximately relative to an objective function, such as the objective function of expression 3, for example.

In particular embodiments, instructions implementable by a computing device may be employed to process signals and/or states, such as memory states, representing, for example, a weight matrix (C) and a coefficient matrix (A), which may correspond to matrices of expressions 22, and/or 25. In embodiments, using semi-definite programming may produce two types of query suggestions (e.g., less desirable query suggestions and more desirable query suggestions). Of course, after employing SDP to compute a value or values, the value or values may be used to produce query suggestions. Implementable instructions may proceed substantially in accordance with the following example approach, although this is a non-limiting example embodiment. Claimed subject matter is, thus, not limited in scope to this example illustration.

Construct a matrix of expression 25 and obtain an appropriate value of X using, for example, semi-definite programming.

Employ a decomposition approach, such as a Cholesky decomposition approach, to X and obtain, for example, the vector "z" using, for example, the expression $X = z^T z$ Assign $y_i$ value by $y_i = z_i (1 \le i \le n)$ using, for example, expression 21.

Obtain $x_i$ using, for example, $x_i = (y_i - 1)/3$ from expression 17a.

Obtain the median value $\{x_1, x_2, \ldots x_n\}$, which may be denoted $x_{median}$.

Using expression 26, below, assign nodes of the weighted graph of FIG. 3 substantially according to:

$$x_i^* = \begin{cases} 1 & \text{if } x_i \ge x_{median} \\ -1 & \text{if } x_i < x_{median} \end{cases} \quad (26)$$

In embodiments, nodes of expression 26 represent nodes of weighted graph 300 of FIG. 3. Nodes comprising values of approximately 1.0 may be located in region S and may represent more desirable query suggestions. Nodes of a weighted graph assigned to values of approximately −1.0, may represent less desirable query suggestions and may be located in region T of graph 300 of FIG. 3.

Figure 4:
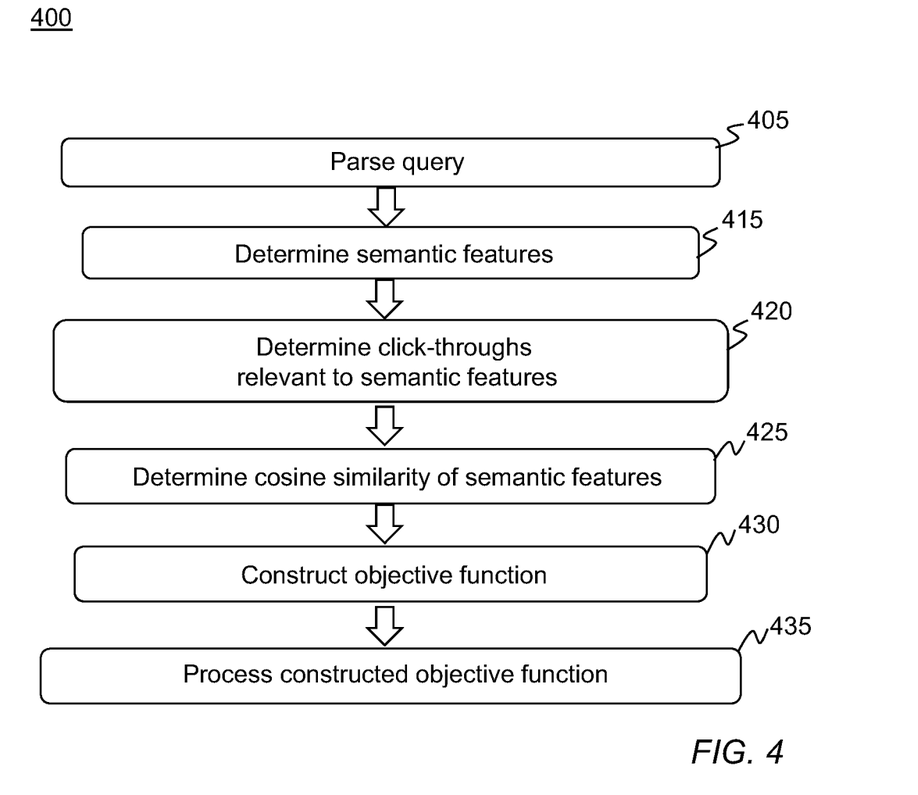
FIG. 4 is a flow diagram for a method of processing according to an embodiment.

FIG. 4 is a flow diagram for an example method 400 of performing search query processing according to an embodiment. Example methods, such as the method implementation of FIG. 4, may include blocks in addition to those shown and described, fewer blocks than those shown and described, blocks occurring in an order different than those shown and described, or any combination thereof and claimed subject matter is not limited in these respects. The example method of FIG. 4 may begin at block 405, which may comprise a server, such as server 230 of FIG. 2, to process a query, such as a complex query from a client computing device, for example, to parse one or more queries into, for example, constituent search terms. At block 415, semantic features may be determined, for example, through use of a semantic features index such as semantic features index 240 of FIG. 2.

At block 420, responsive to access of a click-through database, such as click through database 250 of FIG. 2, click-throughs pertaining to semantic features may be determined. In embodiments, determining click-throughs pertaining to semantic features, such as expressed in expression 1, may take place. At block 425, similarity may be computed between semantic features of complex queries. In embodiments, for example, cosine similarity may be computed in accordance with expression 2. The method may continue at block 430, which may comprise constructing an objective function, such as the objective function of expression 3, for example. Block 435 may comprise processing a constructed objective function.

For example, an objective function may be processed using K-means clustering, at least in one embodiment. In another embodiment, block 435 may comprise use of semi-definite programming to process, for example, a constructed objective function. It should be noted, however, that additional approaches for processing may be employed and claimed subject matter is not limited in this respect.

Figure 5:
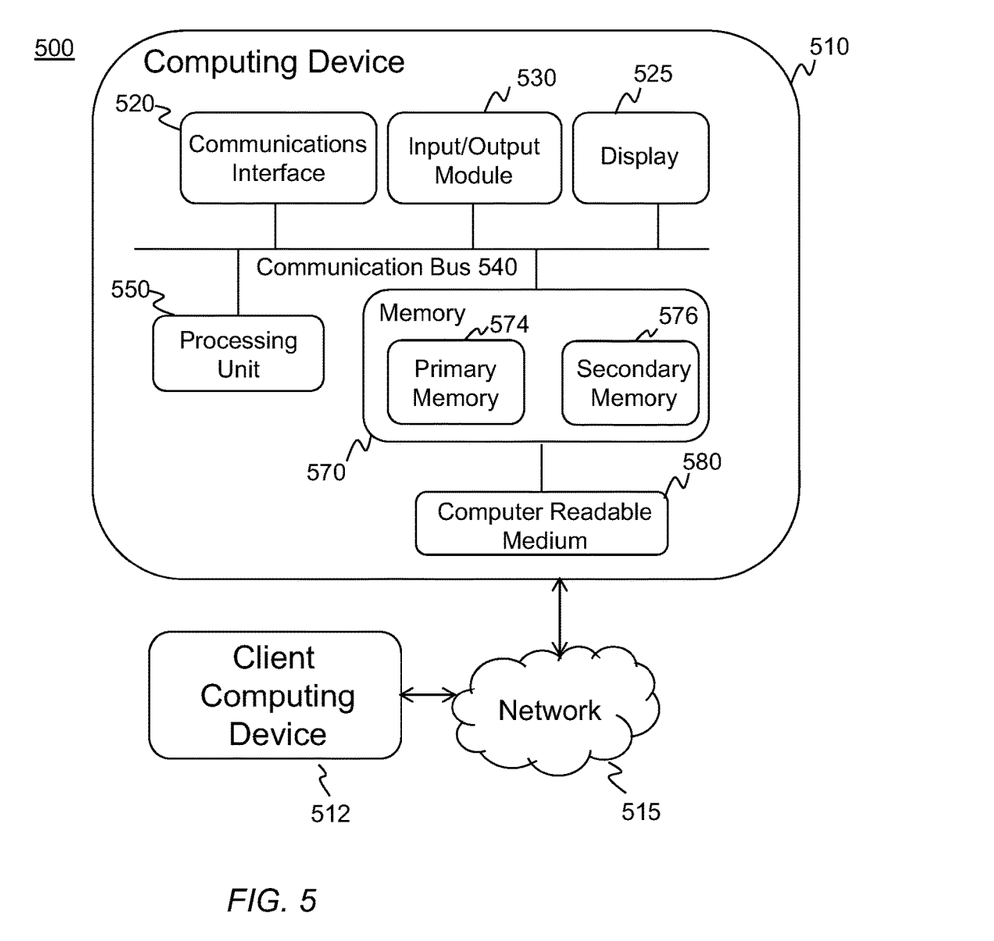
FIG. 5 is a schematic diagram of a computing device that may be employed according to an embodiment.

For purposes of illustration, FIG. 5 is a schematic diagram 500 of a computing platform that may be employed for search query processing according to an embodiment. The computing platform of FIG. 5 may comprise computing device 510 that may be employed to perform functions described herein. In FIG. 5, computing device 510 may interface with client device 512, which may comprise features of a client computing device, such as client computing device 225 of FIG. 2, for example. Communications interface 520, processor (e.g., processing unit) 550, and memory 570, which may comprise primary memory 574 and secondary memory 576, may communicate by way of communication bus 540, for example. In FIG. 4, computing device 510 may store various forms computing device-implementable instructions, by way of input/output module 530, for example, such as those that direct operation of search engines to process search queries, such as complex search queries, such as by constructing and processing objective functions that may be employed to identify semantically related queries, for example, and claimed subject matter is not limited in this respect. Client computing device 512 may communicate with computing device 510 by way of an Internet connection via network 515, for example. Although the computing platform of FIG. 5 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 550 may be representative of one or more circuits, such as digital circuits, to perform at least a portion of a computing procedure or process. By way of example but not limitation, processor 550 may comprise one or more processors, such as controllers, microprocessors, microcontrollers, application specific integrated circuits, digital signal processors, programmable logic devices, field programmable gate arrays, and the like, or any combination thereof. In implementations, processor 550 may perform signal processing to manipulate signals or states or to construct signals or states, for example.

Memory 570 may be representative of any storage mechanism. Memory 570 may comprise, for example, primary memory 574 and secondary memory 576, additional memory circuits, mechanisms, or combinations thereof may be used. Memory 570 may comprise, for example, random access memory, read only memory, or one or more data storage devices or systems, such as, for example, a disk drive, an optical disc drive, a tape drive, a solid-state memory drive, just to name a few examples. Memory 570 may be utilized to store a program, as an example. Memory 570 may also comprise a memory controller for accessing storage media, such as computer readable-medium 580 that may generate electronic signals representing search query result and/or search query suggestions, such as previously described, for example. Under the direction of processor 550, memory, such as cells storing physical states, representing for example, a program, may be executed by processor 550 and generated signals may be transmitted via the Internet, for example. Processor 550 may also receive digitally-encoded signals from computing device 510.

Network 515 may comprise one or more communication links, processes, and/or resources to support exchanging communication signals between a client and server, which may, for example, comprise one or more servers. By way of example, but not limitation, network 515 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store values, such as binary digital values, in the form of signals and/or states. Thus, a computing platform, in this context, may comprise hardware, software, firmware, or any combination thereof (other than software per se). Computing platform 510, as depicted in FIG. 5, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 670 may store cookies relating to one or more users and may comprise a computer-readable medium that may carry and/or make accessible content, code and/or instructions, for example, executable by processor 650 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated among devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google-F, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. An apparatus, comprising:
  a processor executing content, code, and/or instructions stored in memory to:
    identify one or more query suggestions as semantically relevant to at least one query via click through feedback to be based, at least in part, on nodes of a weighted graph;
    represent the nodes of the weighted graph as the one or more query suggestions, wherein nodes comprising values of a first sign to represent more desirable query suggestions of the one or more query suggestions and nodes comprising values of a sign opposite to the first sign to represent less desirable query suggestions of the one or more query suggestions;
    indicate edges of the weighted graph as a correlation between two nodes; and
    partition the weighted graph into at least one region to represent the more desirable query suggestions, and at least one other region to represent less desirable query suggestions based, at least in part, on a computed median value of the nodes of the weighted graph.

2. The apparatus of claim 1, wherein the processor executing content, code, and/or instructions stored in memory is additionally to:
  transmit output signals via a network to a client device.

3. The apparatus of claim 1, wherein processor executing content, code, and/or instructions stored in memory is additionally
  to determine the one or more query suggestions via a semi-definite programming (SDP) approach to process an objective function.

4. The apparatus of claim 3, the processor executing content, code, and/or instructions stored in memory is additionally to employ the semi-definite programming (SDP) approach to perform the partitioning of the weighted graph.

5. The apparatus of claim 3, the processor executing content, code, and/or instructions stored in memory is additionally to:
  transmit output signals to comprise the one or more query suggestions.

6. The apparatus of claim 5, wherein the processor executing content, code, and/or instructions stored in memory is additionally to transmit the output signals via a network to a client device.

7. A method comprising:
  executing, by processor, computer content, code, and/or instructions stored in memory to provide:

identifying one or more query suggestions as semantically relevant to at least one query via click through feedback based, at least in part, on nodes of a weighted graph, the nodes of the weighted graph to represent a plurality of query suggestions; and partitioning the weighted graph into at least one region to represent more desirable query suggestions of the plurality of query suggestions and at least one region to represent less desirable query suggestions of the plurality of query suggestions based, at least in part, on a computed median value of the nodes of the weighted graph, wherein nodes comprising values of a first sign to represent the more desirable query suggestions and nodes comprising values of a second sign opposite to the first sign to represent less desirable query suggestions.

8. The method of claim 7, and further comprising transmitting output signals comprising the one or more identified query suggestions via a network to a client device.

9. The method of claim 7, further comprising processing of an objective function utilizing a semi-definite programming (SDP) approach to identify query suggestions semantically related to terms of the at least one query.

10. The method of claim 9, wherein the SDP approach comprises the partitioning of the weighted graph.

11. The method of claim 10, and further comprising:
transmitting output signals comprising the one or more query suggestions.

12. The method of claim 11, wherein the transmitting comprises transmitting the output signals via a network to a client device.

13. An article comprising:
a non-transitory storage medium having stored thereon content, code, and/or instructions capable of being executed by at least one computing device coupled to a memory to identify one or more query suggestions as semantically relevant to at least one query via click through feedback based, at least in part, on nodes of a weighted graph, the nodes of the weighted graph to represent query suggestions, wherein the weighted graph to be partitioned into at least one region to represent more desirable query suggestions and at least one region to represent less desirable query suggestions based, at least in part, on a computed a median value of the nodes of the weighted graph, wherein nodes comprising values of a first sign to represent the more desirable query suggestions and nodes comprising values of a sign opposite to the first sign to represent less desirable query suggestions.

14. The article of claim 13, wherein the content, code, and/or instructions to determine the one or more query suggestions are to use a semi-definite programming (SDP) approach to process an objective function.

15. The article of claim 14, the content, code, and/or instructions further to employ the SDP approach to perform the partitioning of the weighted graph.

* * * * *